(12) United States Patent
Inaba

(10) Patent No.: US 11,371,458 B2
(45) Date of Patent: Jun. 28, 2022

(54) INJECTION CONTROL DEVICE

(71) Applicant: DENSO CORPORATION, Kariya (JP)

(72) Inventor: Masashi Inaba, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/529,341

(22) Filed: Aug. 1, 2019

(65) Prior Publication Data

US 2020/0072153 A1 Mar. 5, 2020

(30) Foreign Application Priority Data

Aug. 29, 2018 (JP) .............................. JP2018-160347

(51) Int. Cl.
- *F02D 41/30* (2006.01)
- *F02D 41/34* (2006.01)
- *F02D 41/20* (2006.01)

(52) U.S. Cl.
CPC ......... *F02D 41/34* (2013.01); *F02D 41/3005* (2013.01); *F02D 41/20* (2013.01); *F02D 2041/202* (2013.01); *F02D 2041/2003* (2013.01); *F02D 2041/2058* (2013.01)

(58) Field of Classification Search
CPC ...... F02D 41/20; F02D 41/34; F02D 41/3005; F02D 2041/2058; F02D 2041/202; F02D 2041/2003; F02D 2041/2006
USPC ................. 123/472, 478, 490; 701/103–105; 73/114.45, 114.49
See application file for complete search history.

(56) References Cited

U.S. PATENT DOCUMENTS

| | | | | |
|---|---|---|---|---|
| 8,514,541 B2* | 8/2013 | Hatanaka | ................ | F02D 41/20 361/152 |
| 9,890,729 B2* | 2/2018 | Tanaka | .................... | F02D 41/20 |
| 2009/0177369 A1* | 7/2009 | Miyake | ................... | F02D 41/20 701/105 |
| 2011/0222202 A1* | 9/2011 | Onda | ...................... | F02D 41/20 361/152 |
| 2012/0180762 A1* | 7/2012 | Casasso | .................. | F02D 41/20 123/472 |
| 2013/0139791 A1* | 6/2013 | Kusakabe | ............... | F02D 41/20 123/478 |
| 2014/0316679 A1 | 10/2014 | Nishida et al. | | |
| 2015/0377176 A1* | 12/2015 | Hatanaka | ............. | F02M 51/061 137/554 |

FOREIGN PATENT DOCUMENTS

| | | |
|---|---|---|
| JP | H11-013524 A | 1/1999 |
| JP | 2003-278585 A | 10/2003 |
| JP | 2015-175325 A | 10/2015 |

* cited by examiner

*Primary Examiner* — Gonzalo Laguarda
(74) *Attorney, Agent, or Firm* — Posz Law Group, PLC

(57) ABSTRACT

An injection control device has a current supply controller controlling a supply of an electric current for opening and closing a fuel injection valve, a current monitor monitoring the electric current supplied to the valve, and a boost controller performing a boost voltage generation control that generates a boost voltage from a power supply voltage by a tuning ON/OFF of a switching element for supplying a peak current to open the valve. When the current supply controller supplies the peak current to the fuel injection valve, the boost controller stops the boost voltage generation control in a stop period that includes a timing when an electric current supply amount takes a threshold value of the peak current.

15 Claims, 8 Drawing Sheets

INJECTION CONTROL DEVICE

CROSS REFERENCE TO RELATED APPLICATION

The present application is based on and claims the benefit of priority of Japanese Patent Application No. 2018-160347, filed on Aug. 29, 2018, the disclosure of which is incorporated herein by reference.

TECHNICAL FIELD

The present disclosure generally relates to an injection control device for controlling opening and closing of a fuel injection valve.

BACKGROUND INFORMATION

An injection control device is a device used for opening and closing an injection valve to inject fuel. The injection control device is configured to perform a valve opening control by applying a high voltage to an electrically-operated fuel injection valve. Since a high voltage is required, a boost controller is provided for the injection control device. The boost controller controls boosting of a battery voltage which is a reference power supply voltage of a power supply circuit, and performs a valve opening control by applying the boost voltage to the fuel injection valve.

When the injection control device monitors a supply current of the fuel injection valve to perform the valve opening/closing control, a noise accompanying the boost control operation by the boost controller may be transmitted via a wiring board or a power supply system path, which deteriorates an accuracy of a supply current monitor operation (i.e., current monitor accuracy). The fuel injection amount varies according to an accumulated value of the supply current of the fuel injection valve. Therefore, when the current monitor accuracy deteriorates, the calculated fuel injection amount varies. If the calculated fuel injection amount varies, the exhaust emission deteriorates due to the influence of the variation of the calculated fuel injection amount, which thereby worsens the fuel mileage.

In order to solve such a problem, the present disclosure stops the boost control by the boost controller in an entire application period of the boost voltage to the fuel injection valve. In some embodiments, however, it may not be preferable to stop the boost control by the boost controller in the entire application period, since such a stop of the boost control decreases a voltage boost time per one cycle of an internal-combustion engine, thereby requiring a high-capacity/large-scale boost circuit that can quickly boost the supply voltage in a short time.

SUMMARY

It is an object of the present disclosure to provide an injection control device capable of suppressing variations in an injection amount by improving a current monitor accuracy.

According to one aspect of the present disclosure, when a current supply controller supplies the peak current to the fuel injection valve, a boost controller stops the boost voltage generation control in a stop period that includes a point in time (i.e., a timing) when an electric current supply amount takes a threshold value of the peak current.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
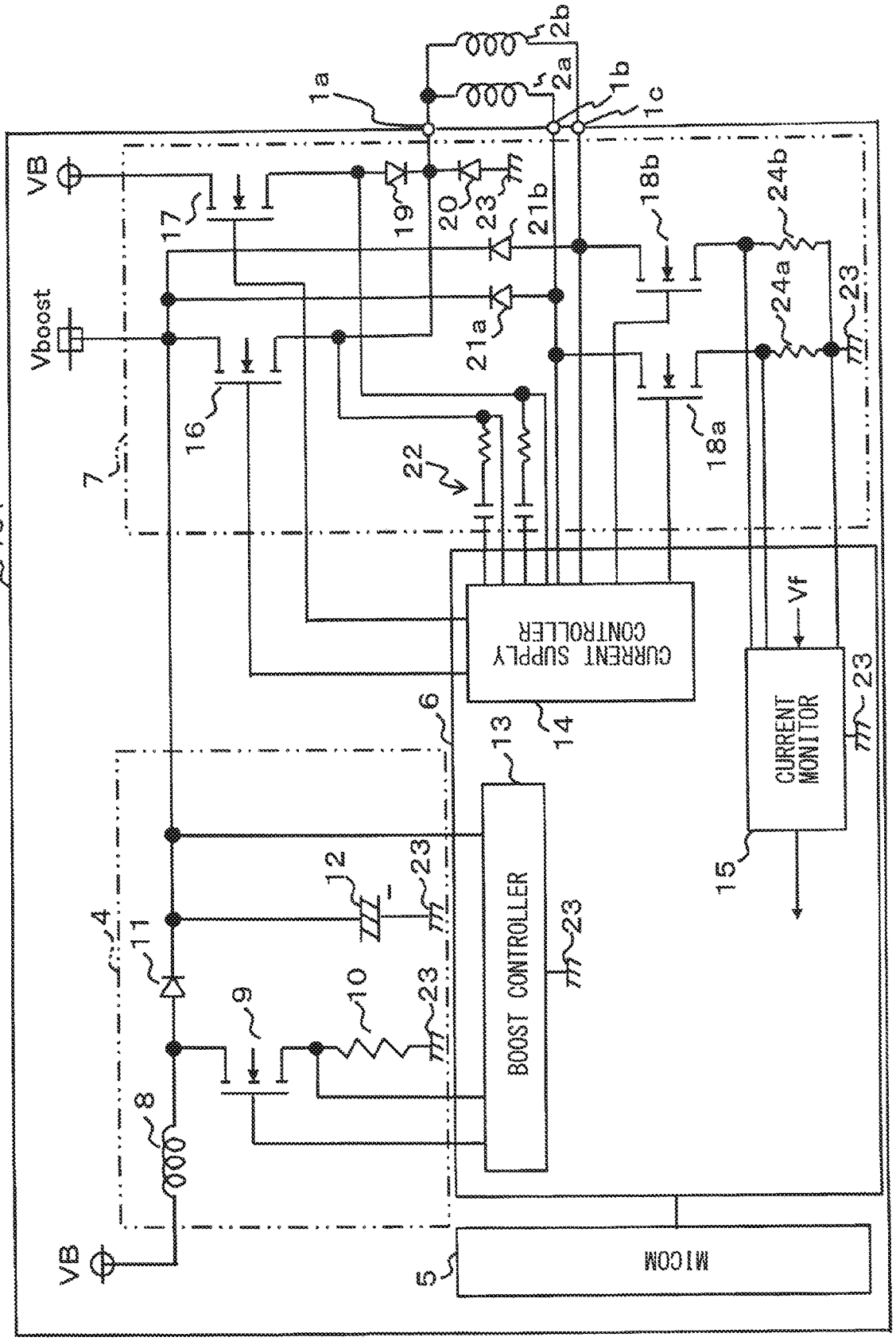
FIG. 1 is an electrical configuration diagram of an electronic control device according to a first embodiment of the present disclosure.

Hereinafter, exemplary embodiments of the present disclosure will be described with reference to the attached drawings. In each of the embodiments described below, the same or similar reference numerals are used for the same or similar configurations, and the description is omitted as necessary.

First Embodiment

Figure 2:
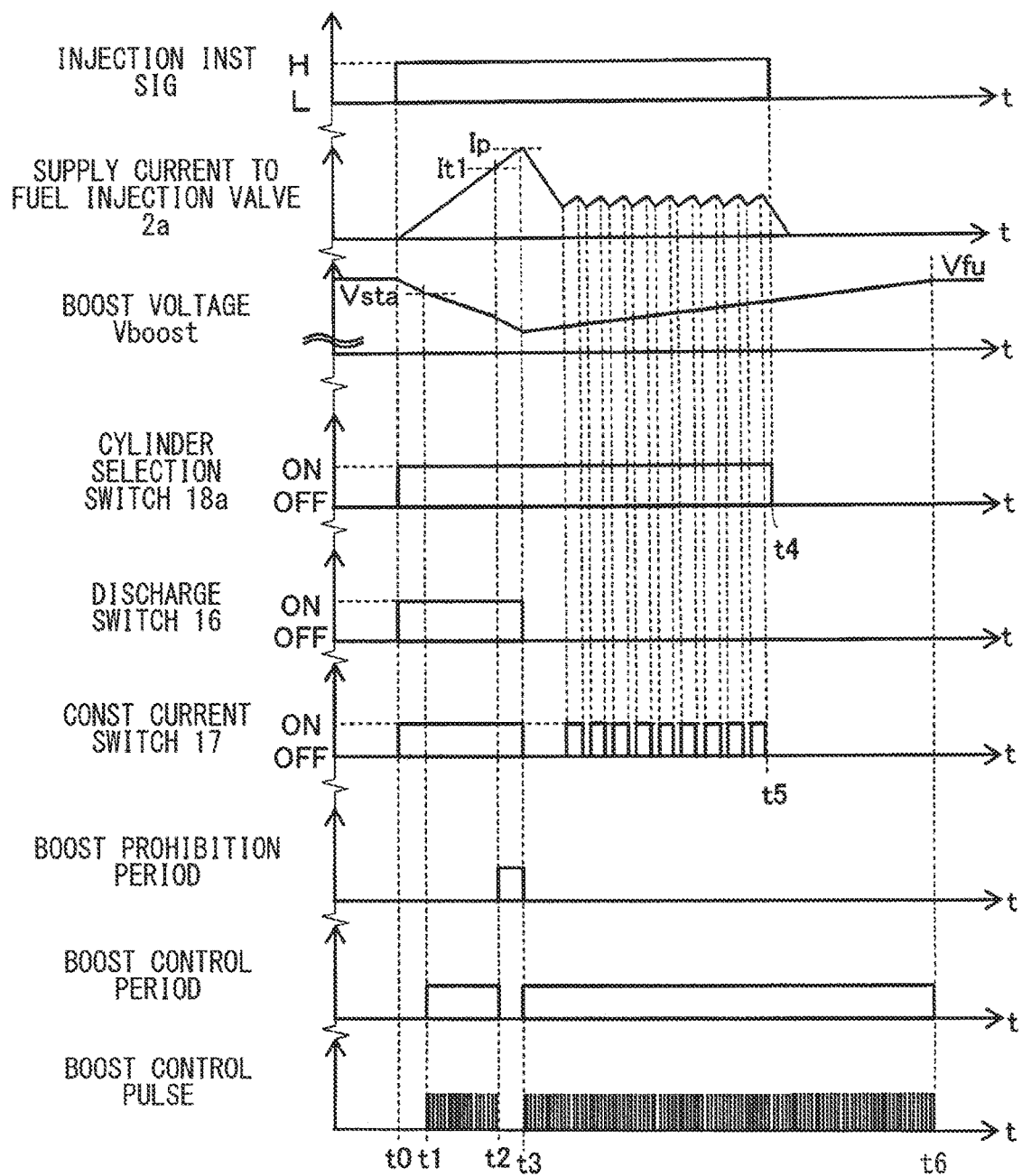
FIG. 2 is a timing chart schematically showing a signal change in the first embodiment of the present disclosure.

FIG. 1 and FIG. 2 are explanatory diagrams of the first embodiment. FIG. 1 schematically shows an electrical configuration example of an electronic control device, which may be a so-called ECU, an abbreviation of an electronic control unit, 101.

As shown in FIG. 1, the electronic control unit 101 includes N pieces of, for example, a solenoid-type fuel injection valve (i.e., an injector) 2*a* and 2*b* for injecting and supplying fuel to N pieces of cylinder of an internal-combustion engine disposed in a vehicle such as an automobile. FIG. 1 is an example of two cylinders, which may also be four, six or other numbers of cylinders.

The electronic control device 101 is configured as a device which has a booster circuit 4, a microcomputer (hereinafter may be abbreviated as a micom) 5 outputting an injection instruction signal, a control IC 6, and a drive circuit 7 mounted on a printed wiring board (not shown). The booster circuit 4 is constituted by, for example, a DC/DC converter using a step-up chopper circuit having an inductor 8, a MOS transistor 9 as a switching element, a current detection resistor 10, a diode 11, and a boost capacitor 12 in the illustrated form. The form of the booster circuit 4 is not necessarily limited to this illustrated form, but may also be provided in various forms.

The microcomputer 5 includes a CPU, a ROM, a RAM, an I/O, etc. (not shown), and performs various processing operations based on a program stored in the ROM. The microcomputer 5 calculates an injection instruction timing based on a sensor signal from a sensor (not shown) provided outside of the device 101, and outputs a fuel injection instruction signal to the control IC 6 at the injection instruction timing.

The control IC 6 is, for example, an integrated circuit device based on an ASIC, and includes a controlling part such as a logic circuit, a CPU, and the like, a storage unit (not shown) such as a RAM, a ROM, an EEPROM, a comparison device using a comparator, and the like, and is configured to execute various controls based on hardware and software. The control IC 6 has functions as a boost controller 13, a current supply controller 14, and a current monitor 15. The control IC 6 also has other functions, which are not illustrated and not described in the following.

The boost controller 13 detects a voltage between, for example, an anode of the boost capacitor 12 and a ground node 23, detects a current flowing through the current detection resistor 10, and turns ON and OFF the MOS transistor 9, whereby controlling the boost operation of the booster circuit 4. The boost controller 13 performs switching control of the MOS transistor 9 to turn it ON and OFF, thereby rectifying the current energy stored in the inductor 8 by using the diode 11 and supplying it to the boost capacitor 12 as a boost voltage. The voltage boosted for and supplied to the boost capacitor 12 is referred to as a boost voltage Vboost. The boost controller 13 monitors/watches the boost voltage Vboost by monitoring the voltage between the anode of the boost capacitor 12 and the ground node 23, and, when the boost voltage Vboost reaches (i.e., falls below) a predetermined boost start voltage Vsta (i.e., see FIG. 2), starts the boost control, and the boost control is performed until the boost voltage Vboost reaches a boost completion voltage Vfu that is set as a value exceeding the boost start voltage Vsta. In such manner, during a normal operation, the boost controller 13 can output the boost voltage Vboost while controlling the boost voltage Vboost to be brought to the boost completion voltage Vfu.

The current supply controller 14 controls a supply current to open and close the fuel injection valves 2a, 2b, and detects a voltage of the output terminals 1b, 1c while controlling ON and OFF of a discharge switch 16, a constant current switch 17 and cylinder selection switches 18a and 18b.

The current monitor 15 monitors an electric current flowing in the fuel injection valves 2a and 2b with reference to a reference voltage Vf generated based on a power supply voltage VB by, for example, the comparison device, the ND converter and the like (not shown), from the electric current flowing in current detection resistors 24a and 24b, which detects an electric current flowing in the fuel injection valves 2a and 2b as a detection voltage.

The drive circuit 7 includes a discharge switch 16 for turning ON and OFF of the supply/application of the boost voltage Vboost to the fuel injection valves 2a, 2b, a constant current control switch 17 (i.e., hereinafter referred to as a constant current switch 17) for performing a constant current control by using the power supply voltage VB, and cylinder selection switches 18a, 18b. Further, the drive circuit 7 is configured as being connected to other peripheral circuits, for example, diodes 19, 20, 21a, 21b, a bootstrap circuit 22, and current detection resistors 24a and 24b.

The discharge switch 16, the constant current switch 17, and the cylinder selection switches 18a and 18b are configured by using, for example, an n-channel type MOS transistor. These switches 16, 17, 18a and 18b may be constituted by using other types of transistors (e.g., a bipolar transistor). In the present exemplary embodiment, these switches 16, 17, 18a, 18b are respectively provided as an n-channel type MOS transistor.

In the following description, the drain, source, and gate of the discharge switch 16 respectively denote the drain, source, and gate of the MOS transistor constituting the discharge switch 16. Likewise, when denoted as the drain, source and gate of the constant current switch 17, it means the drain, source and gate of the MOS transistor constituting the constant current switch 17, respectively. Similarly, where the drains, sources, and gates of the cylinder selection switches 18a and 18b are described, they mean the drains, sources, and gates of the MOS transistors constituting the cylinder selection switches 18a and 18b, respectively.

The boost voltage Vboost is supplied from the booster circuit 4 to the drain of the discharge switch 16. The source of the discharge switch 16 is connected to an output terminal 1a on an upstream, and the control signal is supplied from the current supply controller 14 of the control IC 6 to the gate of the discharge switch 16. As a result, the discharge switch 16 can supply the boost voltage Vboost of the booster circuit 4 to the output terminal 1a according to the control of the current supply controller 14 of the control IC 6.

The power supply voltage VB is supplied to the drain of the constant current switch 17. The source of the constant current switch 17 is connected to the output terminal 1a on the upstream via the diode 19 in a forward direction. Further, a control signal is supplied from the current supply controller 14 of the control IC 6 to the gate of the constant current switch 17. As a result, the constant current switch 17 can supply the power supply voltage VB to the output terminal 1a according to the control of the current supply controller 14 of the control IC 6.

The diode 19 is connected for preventing backflow from the output node of the boost voltage Vboost of the booster circuit 4 to the output node of the power supply voltage VB when both of the switches 16 and 17 are turned ON. Further, a reflux diode 20 is connected in a reverse direction at a position between the output terminal 1a on the upstream and the ground node 23. The reflux diode 20 is connected to a path for returning electric current when the fuel injection valves 2a and 2b are closed.

The bootstrap circuit 22 is connected to the source of the discharge switch 16 and the source of the constant current switch 17 from the current supply controller 14 of the control IC 6. By the potential boosted by the bootstrap operation of the bootstrap circuit 22, switching of the switches 16 and 17 is controlled.

The fuel injection valves 2a and 2b are connected at positions between the output terminal 1a on the upstream and the output terminals 1b and 1c on the downstream, respectively. Between the output terminal 1b on the downstream and the ground node 23, a drain-source path of the cylinder selection switch 18a and the resistor 24a are connected in series. Between the output terminal 1c on the downstream and the ground node 23, the drain-source path of the cylinder selection switch 18b and the resistor 24b are connected in series. The resistors 24a and 24b are provided for current detection, and are set to about $0.03\Omega$, for example.

The drains of the cylinder selection switches 18a and 18b are connected to the output terminals 1b and 1c on the downstream, respectively. The sources of the cylinder selection switches 18a and 18b are connected to the ground node 23 through the current detection resistors 24a and 24b. The gates of the cylinder selection switches 18a and 18b are connected to the current supply controller 14 of the control IC 6. As a result, the cylinder selection switches 18a, 18b can selectively supply the electric current flowing through the fuel injection valves 2a, 2b according to the control of the current supply controller 14 of the control IC 6.

Regenerative diodes 21a and 21b are connected in the forward direction at positions between the output terminals 1b and 1c on the downstream and the output node of the boost voltage Vboost of the booster circuit 4, respectively. These diodes 21a, 21b are connected to power supply paths of regenerative currents respectively flowing when the fuel injection valves 2a, 2b are closed, and are circuits that flow regenerated currents toward the boost capacitor 12. As a result, the diodes 21a and 21b are configured to flow the regenerative currents through the boost capacitor 12 of the booster circuit 4 when the fuel injection valves 2a and 2b are closed.

The operation of the basic configuration is described below. When the power supply voltage VB, based on the battery voltage, is given to the electronic control device 101, the microcomputer 5 and the control IC 6 are activated. The boost controller 13 of the control IC 6 controls ON/OFF of the MOS transistor 9 by outputting a boost control pulse to the gate of the MOS transistor 9. When the MOS transistor 9 is turned ON, an electric current flows through the inductor 8, the MOS transistor 9, and the current detection resistor 10. When the MOS transistor 9 is turned OFF, an electric current based on a stored energy of the inductor 8 flows through the diode 11 to the boost capacitor 12, and the voltage between the terminals of the boost capacitor 12 rises.

When the boost controller 13 of the control IC 6 outputs the boost control pulse to repeat the ON/OFF control of the MOS transistor 9, the boost voltage Vboost boosted by the boost capacitor 12 exceeds the power supply voltage VB. Thereafter, the boost voltage Vboost of the boost capacitor 12 reaches the boost completion voltage Vfu ($\approx$65 V) which is equal to or higher than the predetermined voltage exceeding the power supply voltage VB. Upon detecting that the boost voltage Vboost has reached the boost completion voltage Vfu, the boost controller 13 stops outputting the boost control pulse. As a result, the boost voltage Vboost is held at the boost completion voltage Vfu (i.e., timing t0 or before in FIG. 2).

When the microcomputer 5 outputs an active level "H" of the injection instruction signal of the fuel injection valve 2a to the control IC 6 at timing t0 in FIG. 2, the current supply controller 14 of the control IC 6 turns ON the cylinder selection switch 18a, and controls the discharge switch 16 and the constant current switch 17 to be turned ON. At such timing, since the boost voltage Vboost is applied to a position between the terminals of the fuel injection valve 2a, the supply current of the fuel injection valve 2a sharply rises and the fuel injection valve 2a starts to open. At such timing, the electric charge accumulated in the boost capacitor 12 is consumed by the supply current of the fuel injection valve 2a, and the boost voltage Vboost starts to decrease.

Thereafter, when the boost voltage Vboost reaches the boost start voltage Vsta, the boost controller 13 detects that the inter-terminal voltage of the boost capacitor 12 (i.e., a voltage across the capacitor 12/a voltage between the terminals of the capacitor 12) has reached the boost start voltage Vsta, and outputs the boost control pulse to the MOS transistor 9, thereby starting the boost control (i.e., timing t1 in FIG. 2).

Meanwhile, the current monitor 15 continuously detects the current flowing through the fuel injection valve 2a by detecting the voltage between the terminals of the current detection resistor 24a, and the current supply controller 14 continues to detect the voltage of the output terminal 1b. Upon detecting that the detection current of the current monitor 15 has reached (i.e., has exceeded) the first predetermined current It1, the boost controller 13 stops the output of the boost control pulse, thereby stopping the generation control of the boost voltage Vboost (i.e., timing t2 in FIG. 2).

Thereafter, when detecting that the detection current of the current monitor 15 has reached a predetermined peak current threshold value Ip, the current supply controller 14 turns OFF the discharge switch 16 and the constant current switch 17 (i.e., timing t3 in FIG. 2). At such timing t3, the current flowing through the fuel injection valve 2a is abruptly cut off, but the current based on the stored energy of the fuel injection valve 2a flows (i.e., keeps flowing) through the reflux diode 20 to the cylinder selection switch 18a and to the current detection resistor 24a, and also flows as a regenerative current to the diode 21a. As a result, the boost capacitor 12 can be boosted by the regenerative current, and the stored energy of the fuel injection valve 2a can be reused.

On the other hand, when detecting that the detection current of the current monitor 15 has reached the peak current threshold value Ip at timing t3, the boost controller 13 restarts the output of the boost control pulse to restart the generation control of the boost voltage Vboost (i.e., a boost prohibition period from timing t2 to t3 in FIG. 2). Since the supply current of the fuel injection valve 2a starts to decrease after timing t3, the boost voltage Vboost starts to rise after timing t3.

Thereafter, based on the detection current of the current monitor 15, the current supply controller 14 controls the ON/OFF control of the constant current switch 17, for controlling the supply current of the fuel injection valve 2a to be in a predetermined constant current range in a period from timing t3 to t4 in FIG. 2. The constant current range is a range in which both the maximum value and the minimum value of the electric current are set to be lower than the peak current threshold value Ip. As a result, the current supply controller 14 can control the current of the fuel injection valve 2a to be within a certain range, i.e., in the constant current range.

Thereafter, when the microcomputer 5 outputs the injection instruction signal of the fuel injection valve 2a as a signal in a non-active level "L" to the control IC 6 at timing t5 in FIG. 2, the current supply controller 14 controls the discharge switch 16, the constant current switch 17, and the cylinder selection switch 18a to be all turned OFF. Then, the supply current of the fuel injection valve 2a rapidly decreases, and the magnetization of the stator of the fuel injection valve 2a is stopped. As a result, the needle inside the fuel injection valve 2a, which has been attracted by the electromagnet of the stator, returns to its initial position by the biasing force of an elastic member in accordance with the disappearance of the electromagnetic force, and the fuel injection valve 2a is closed. At such timing, the regenerative current similar to the one described above flows from the fuel injection valve 2a to the boost capacitor 12 through the diode 21a, and the stored energy of the fuel injection valve 2a can be regenerated to the boost capacitor 12, and the energy can be reused.

On the other hand, the boost controller 13 continues to output the boost control pulse until the boost voltage Vboost reaches the boost completion voltage Vfu (i.e., timing t3 to t6 in FIG. 2). The boost controller 13 stops the output of the boost control pulse when the boost voltage Vboost reaches the boost completion voltage Vfu (i.e., timing t6 in FIG. 2).

In the present embodiment, the boost controller 13 temporarily stops generation control of the boost voltage Vboost from timing t2 to t3 in FIG. 2. This is because, if the boost controller 13 continues the generation control of the boost voltage Vboost from timing t2 to t3, noise accompanying the boost control operation by the boost controller 13 is transmitted in the printed wiring board or the power supply system path, which adversely affects the reference voltage Vf and the ground potential used by the current monitor 15. That is, when the reference voltage Vf and/or the ground potential fluctuates, timing t3 at which the supply current of the fuel injection valve 2a reaches the peak current threshold value Ip cannot be accurately determined.

Therefore, in the present embodiment, the boost controller 13 temporarily stops the generation control of the boost voltage Vboost in the period from timing t2 to timing t3 in FIG. 2, which extends from a timing at which the supply current of the fuel injection valve 2a exceeds the first predetermined current It1 to a timing at which the supply current reaches the peak current threshold value Ip.

In such a manner, the generation of the switching noise by the MOS transistor 9 is stopped, and timing t3 at which the monitor current of the current monitor 15 reaches the peak current threshold value Ip is accurately detectable. As a result, the current monitor accuracy of the current monitor 15 can be improved, and the peak current value can be accurately controllable.

The control IC 6 transmits the current value to the microcomputer 5, and the microcomputer 5 calculates the injection amount based on the integrated amount of the monitor current by the current monitor 15. At such timing, since the current monitor accuracy by the current monitor 15 is improved, the microcomputer 5 can accurately calculate the injection amount. By improving the current monitor accuracy, variations in the calculated injection amount are reducible. In such manner, exhaust emission can be improved and fuel mileage can be improved.

Since the peak current threshold value Ip varies depending on the structure of the fuel injection valves 2a and 2b and individual differences among the products, etc., it is preferable to adjust the peak current threshold value Ip to an optimum value beforehand at the time of manufacturing or the like. The first predetermined current It1 may be calculated by subtracting a constant value (for example, 1 V) from the monitor detection voltage value of the current monitor 15 corresponding to the peak current threshold value Ip. Further, the first predetermined current It1 may be calculated by multiplying the value of the peak current threshold value Ip by a constant ratio (for example, 0.9). Any value may be usable as long as the first predetermined current It1 is set as a value that is lower than the peak current threshold value Ip.

As described above, according to the present embodiment, in the period including timing t3 at which the supply current under control of the supply current controller 14 reaches the peak current threshold value Ip when the peak current for valve opening is supplied to the fuel injection valve 2a, the boost controller 13 stops the generation control of the boost voltage Vboost. As a result, the monitoring accuracy of the peak current by the current monitor 15 can be improved. For example, when the peak current is about 12 A, for example, accuracy of several tens of mA or less can be achieved. As a result, the microcomputer 5 can accurately calculate and control the injection amount, and thus can suppress the variation of the injection amount. As a result, exhaust emission can be improved and fuel mileage can be improved.

Also, in the period (i) from a timing when the supply current of the fuel injection valve 2a exceeds the first predetermined current It1 that is set to be lower than the peak current threshold value Ip (ii) to a timing when the supply current reaches the peak current threshold value Ip, the boost controller 13 stops the generation control of the boost voltage Vboost. In such manner, the generation control of the boost voltage Vboost is stoppable in the period including the peak current threshold value Ip, thereby the current monitor accuracy of the peak current by the current monitor 15 can be improved.

Second Embodiment

Figure 3:
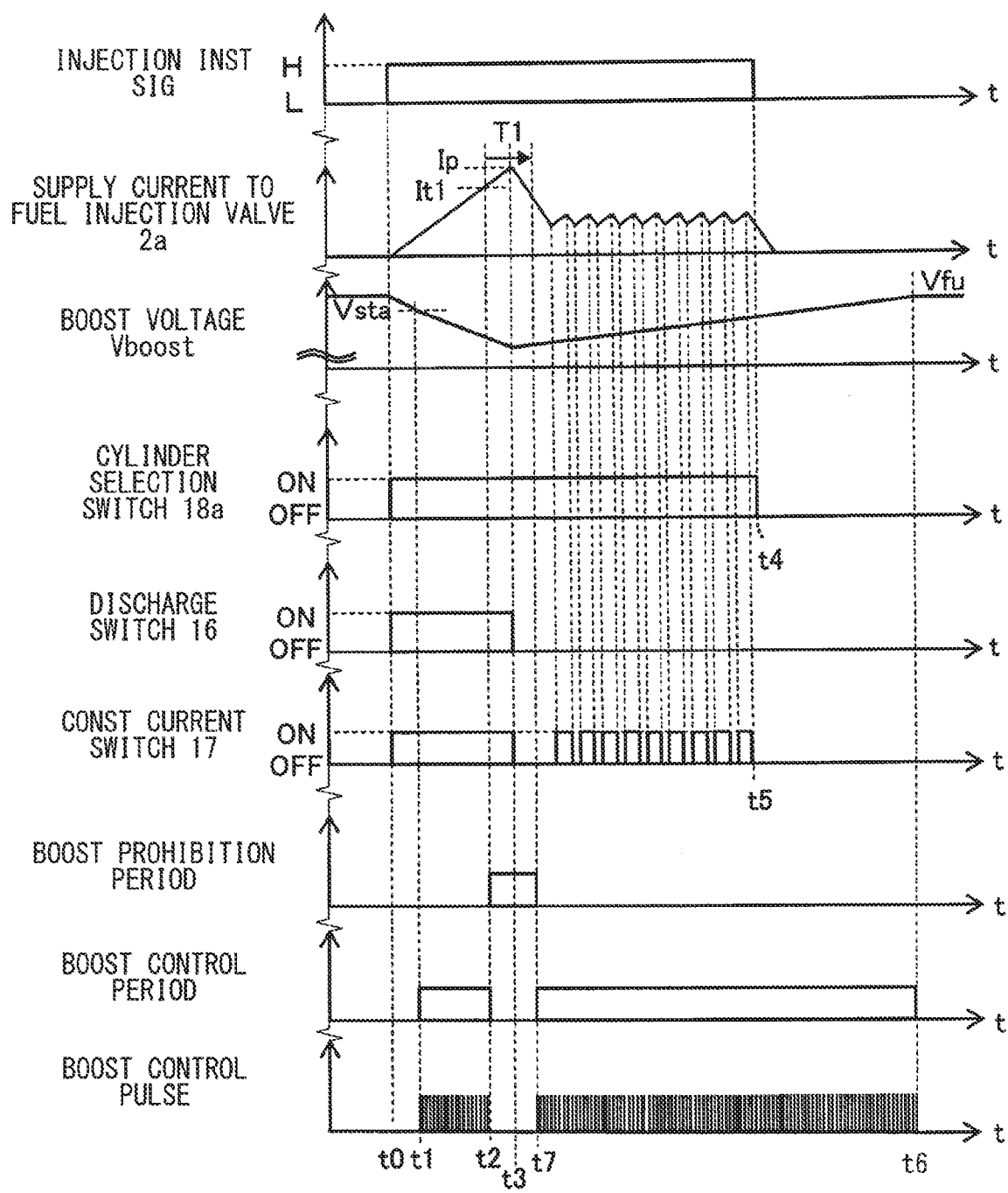
FIG. 3 is a timing chart schematically showing a signal change in a second embodiment of the present disclosure.

FIG. 3 shows an additional explanatory diagram of a second embodiment of the present disclosure. The second embodiment shows a mode in which the boost prohibition period is changed. In particular, as shown in FIG. 3, in a period (i) from timing t2 when the supply current of the fuel injection valve 2a exceeds the first predetermined current It1 (ii) to timing t7 when the first predetermined time T1 lapses therefrom, the boost controller 13 stops the generation control of the boost voltage Vboost. The first predetermined time T1 is determined in advance as an amount of time that is sufficient for the supply current of the fuel injection valve 2a to reach the peak current threshold value Ip after timing t2 at which the supply current has reached the first predetermined current It1. The first predetermined time T1 is measured by using a counter (e.g., a timer) built in the control IC 6.

In such a configuration, the boost controller 13 can stop the generation control of the boost voltage Vboost, in particular, in the period including the peak current threshold value Ip. Therefore, just like the first embodiment, the current monitor accuracy of the peak current by the current monitor 15 can be improved.

Third Embodiment

Figure 4:
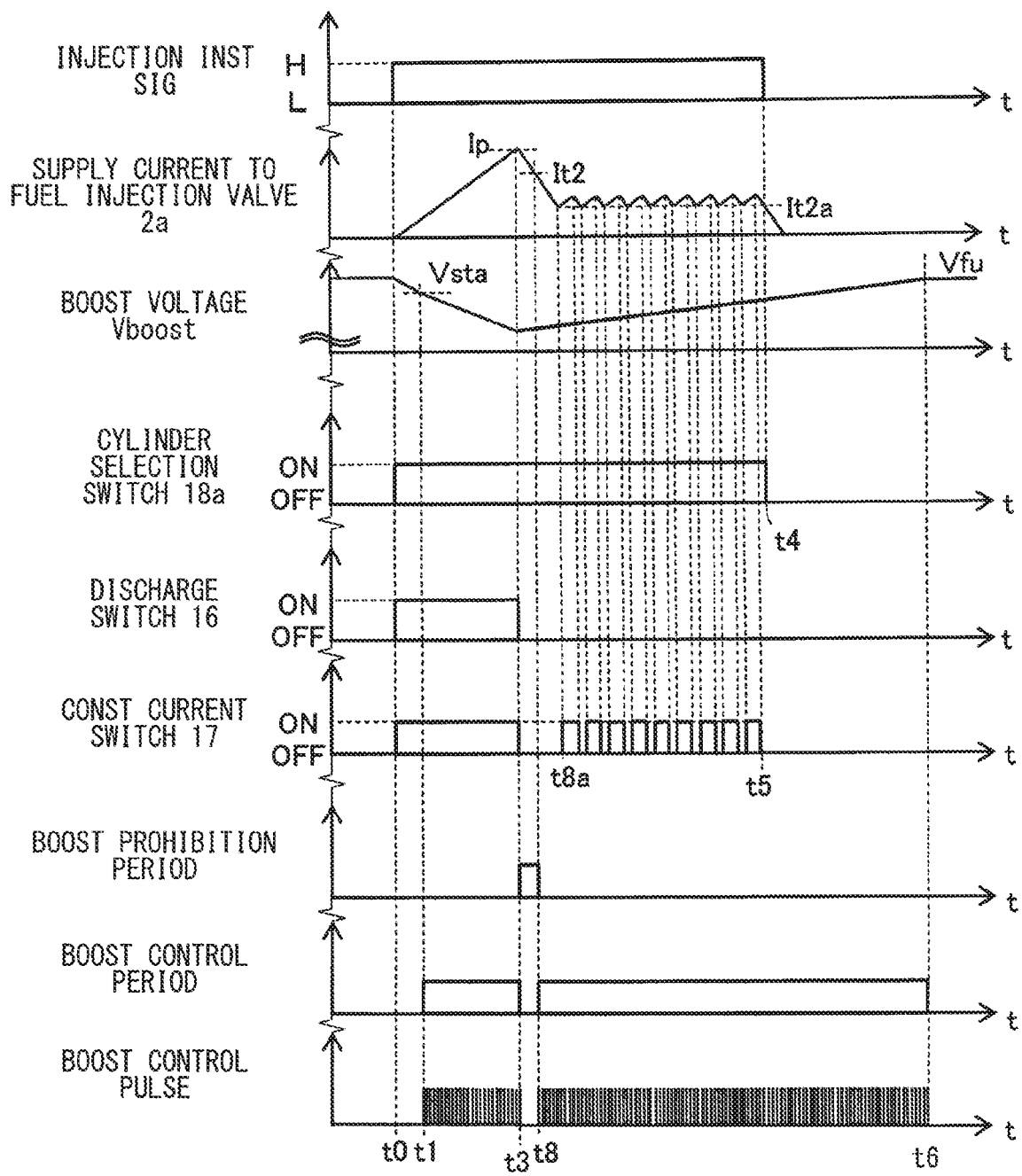
FIG. 4 is a timing chart schematically showing a signal change in a third embodiment of the present disclosure.

FIG. 4 shows an additional explanatory diagram of the third embodiment of the present disclosure. The third embodiment also shows a mode in which the boost prohibition period is changed. In particular, as shown in FIG. 4, (i) from timing t3 when the supply current of the fuel injection valve 2a monitored by the current monitor 15 reaches the peak current threshold value Ip (ii) to timing t8 when the supply current of the fuel injection valve 2a falls below a second predetermined current It2 that is set to be lower than the peak current threshold value Ip, the boost controller 13 stops the generation control of the boost voltage Vboost (i.e., timing t3 to t8 in FIG. 4).

When the supply current of the fuel injection valve 2a reaches the peak current threshold value Ip, the energy based on the electric current is stored in the fuel injection valve 2a, and then immediately after timing t3, the stored energy of the fuel injection valve 2a flows to the cylinder selection switch 18a and the current detection resistor 24a and also flows as the regenerative current to the boost capacitor 12 through the reflux diode 20, the fuel injection valve 2a, and the diode 21a. The regenerative current flowing to the boost capacitor 12 enables reuse of the stored energy of the fuel injection valve 2a.

In the related art, the boost controller 13 performs the generation control of the boost voltage Vboost while the regenerative current is flowing through the boost capacitor 12, the regenerative current in addition to the boost current by the booster circuit 4 flows into the boost capacitor 12 at the same time. Therefore, for example, it may be necessary to select high-spec components such as the boost capacitor 12 so that the boost capacitor 12 can withstand such a large amount of the supply current.

In contrast to the above, in the present embodiment, the boost controller 13 stops the generation control of the boost voltage Vboost from timing t3 when the supply current of the fuel injection valve 2a reaches the peak current threshold value Ip to timing t8 when the supply current falls below the second predetermined current It2. Therefore, it is configured that the aforementioned regenerative current and the boosted current by the booster circuit 4 do not flow simultaneously to the boost capacitor 12, thereby enabling use of a lower specification boost capacitor 12 and the circuit elements in the boosting path thereof. Thus, the circuit can be realized at low cost.

Further, the second predetermined current It2 may be adjusted to be the current threshold value (i.e., minimum value) on the lower limit side of the constant current drive (i.e., FIG. 4). Then, even if the regenerative current continues to flow from timing t3 to t8a in FIG. 4, the generation control of the boost voltage Vboost of the boost controller 13 can be stopped. Therefore, the reliability of the circuit can be improved.

Fourth Embodiment

Figure 5:
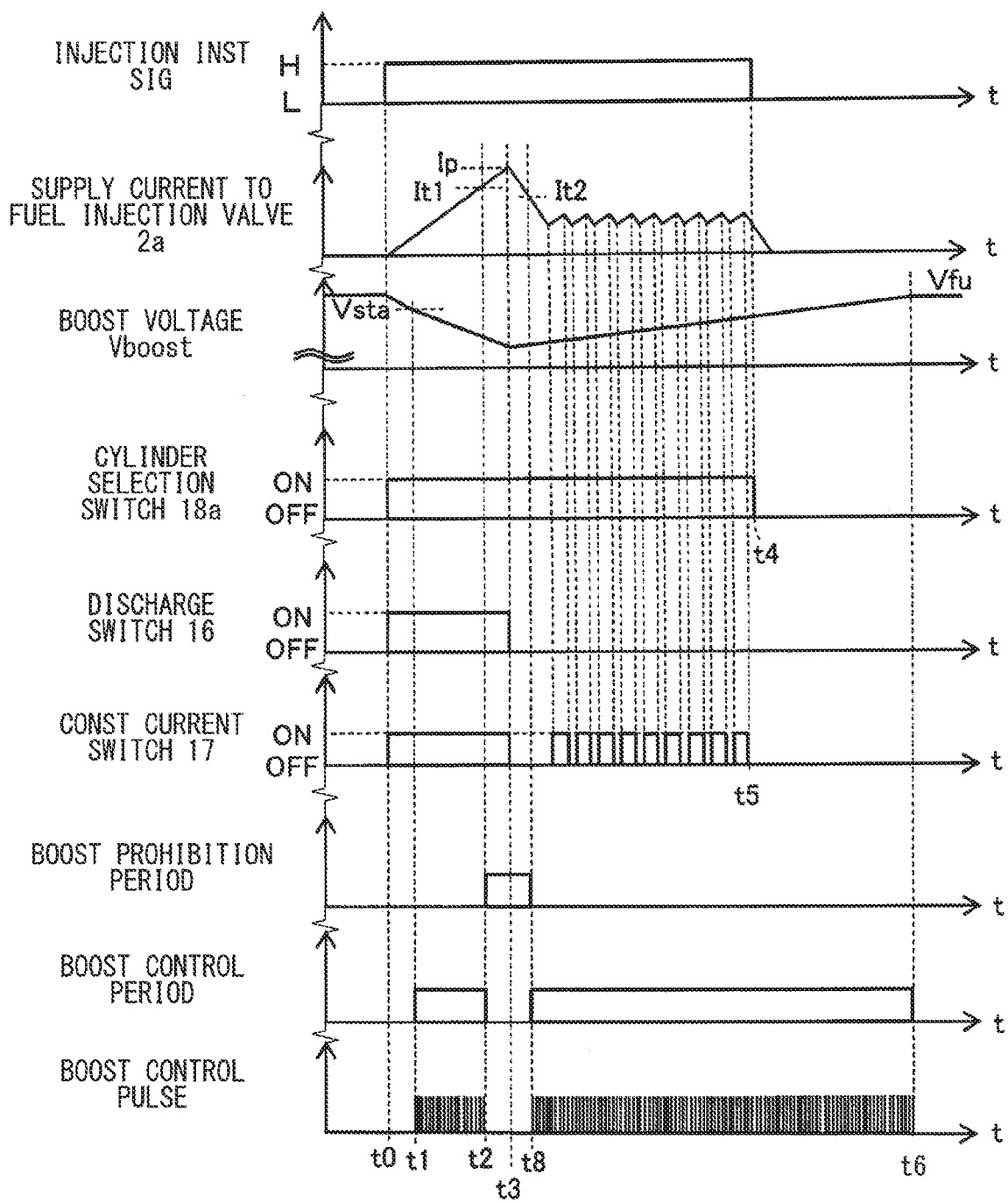
FIG. 5 is a timing chart schematically showing a signal change in a fourth embodiment of the present disclosure.

FIG. 5 shows an additional explanatory diagram of the fourth embodiment of the present disclosure. Also in the fourth embodiment, the boost prohibition period is changed. In particular, as shown in FIG. 5, the boost controller 13 stops the generation control of the boost voltage Vboost, (i) from timing t2 when the supply current of the fuel injection valve 2a monitored by the current monitor 15 exceeds the first predetermined current It1 (ii) through the peak current threshold value Ip (iii) to timing t8 when the supply current reaches (i.e., falls) to the second predetermined current It2 (i.e., timing t2 to t8 in FIG. 5). This is a combination of the configuration of the first embodiment and the configuration of the second embodiment. Therefore, timing t3 when the supply current of the fuel injection valve 2a reaches the peak current threshold value Ip is accurately calculable together with the cost reduction of the circuit by the use of the lower specification circuit elements.

Fifth Embodiment

Figure 6:
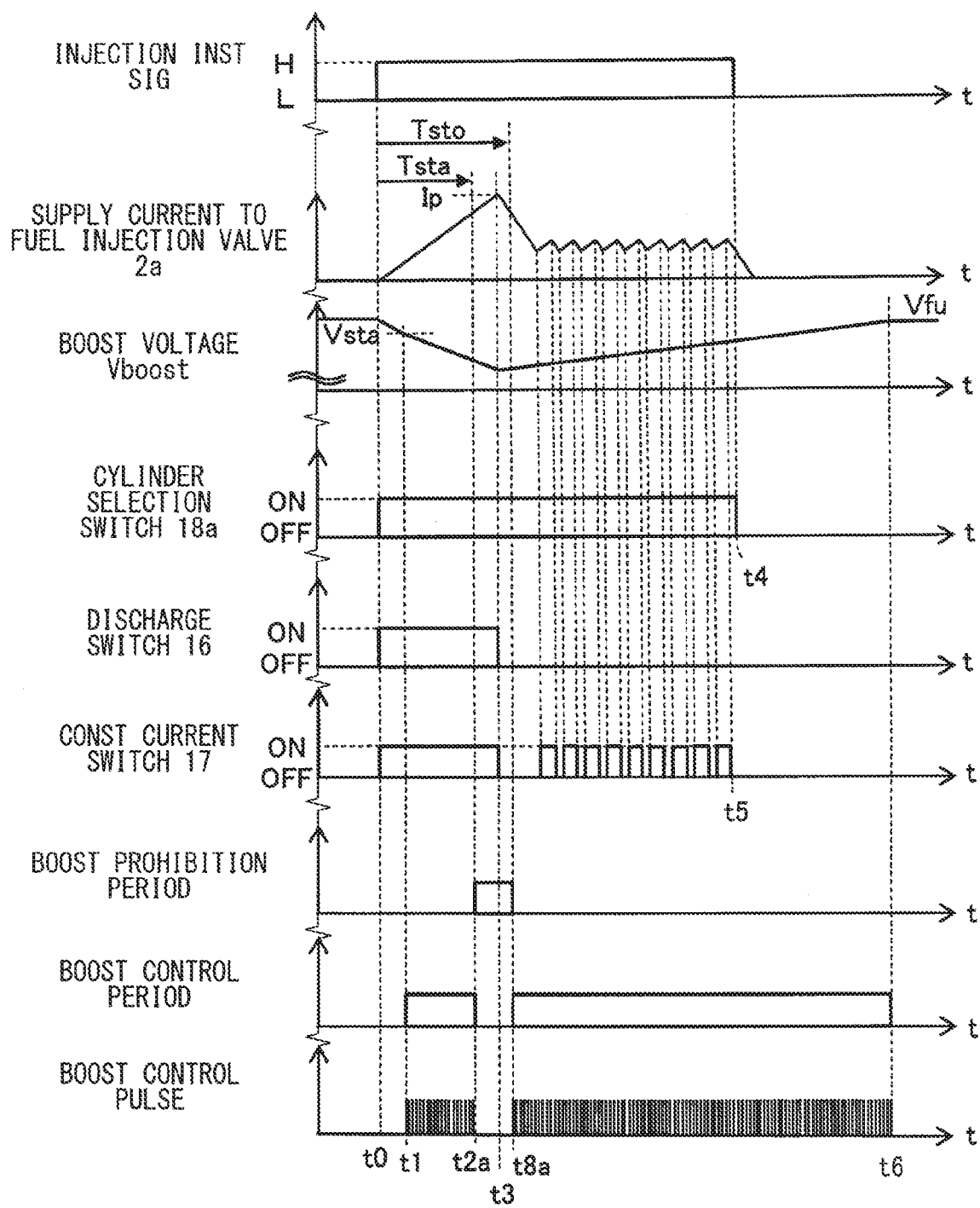
FIG. 6 is a timing chart schematically showing a signal change in a fifth embodiment of the present disclosure.

FIG. 6 shows an additional explanatory diagram of the fifth embodiment of the present disclosure. Also in the fifth embodiment, the boost prohibition period is changed. In particular, as shown in FIG. 6, (i) from timing t2a which is a timing after lapse of a first predetermined time Tsta from start of the current supply of the supply current of the fuel injection valve 2a (ii) to timing t8a when the second predetermined time Tsto has lapsed therefrom, the boost controller 13 stops the generation control of the boost voltage Vboost (i.e., timing t2a to t8a in FIG. 6). The first predetermined time Tsta and the second predetermined time Tsto respectively indicate an elapsed time from the start of supply of the supply current of the fuel injection valve 2a, and the first predetermined time Tsta and the second predetermined time Tsto is measured by using a counter (e.g., a timer) built in the control IC 6. A period between the first predetermined time Tsta and the second predetermined time Tsto may or may not include timing t3 at which the supply current of the fuel injection valve 2a reaches the peak current threshold value Ip.

Therefore, by setting the above-described two timings, i.e., in a period from a "start" timing t2a as a timing after the first predetermined time Tsta from the start of supply of the supply current of the fuel injection valve 2a to an "end" timing t8a as a timing after the second predetermined time Tsto from the start of supply of the supply current to the fuel injection valve 2a, the boost controller 13 stops the generation control of the boost voltage Vboost, thereby the peak current value can be accurately detected. Therefore, the peak current value after a predetermined time from the start of the supply of the electric current is accurately monitored.

Sixth Embodiment

Figure 7:
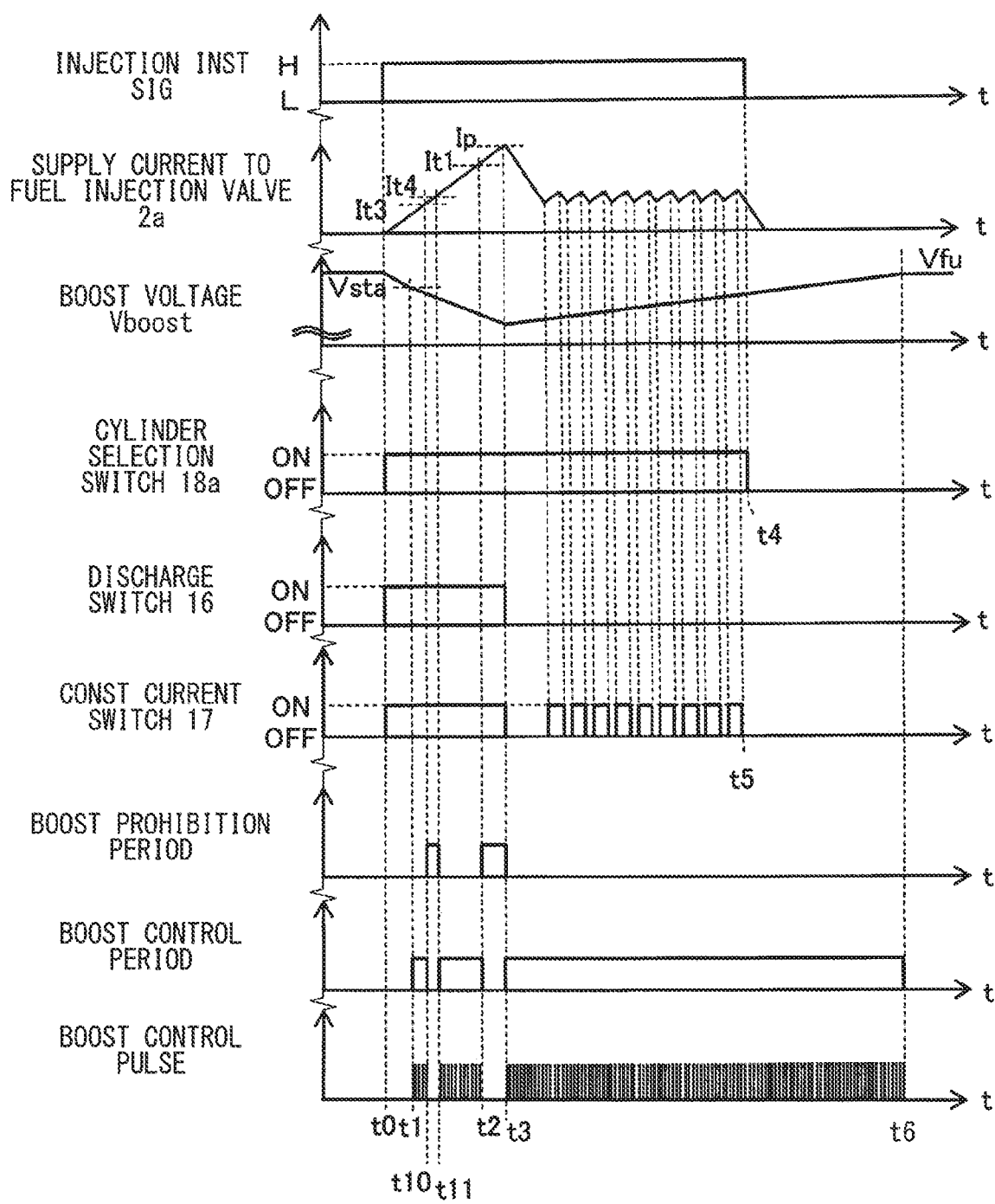
FIG. 7 is a timing chart schematically showing a signal change in a sixth embodiment of the present disclosure.

FIG. 7 shows an additional explanatory diagram of the sixth embodiment of the present disclosure. Also in the sixth embodiment, the boost prohibition period is changed. In particular, as shown in FIG. 7, in a period (i) from timing t2 when the supply current of the fuel injection valve 2a exceeds the first predetermined current It1 (ii) to timing t3 when the peak current threshold value Ip is reached (i.e., timing t2 to t3 in FIG. 7) and also in a period (iii) from timing t10 when the supply current of the fuel injection valve 2a exceeds a third predetermined current It3 before reaching the first predetermined current It1 (iv) to timing t11 when the supply current reaches a fourth predetermined current It4, the control unit 13 stops the generation control of the boost voltage Vboost (i.e., timing t10 to t11 in FIG. 7). In such case, since the boost controller 13 stops the generation control of the boost voltage Vboost from timing t10 to timing t11 during which the supply current rises toward the peak current threshold value Ip, the supply current of the fuel injection valve 2a can be accurately detected during the current rise period from timing t10 to t11. When the electric current can be accurately detected during the period from timing t10 to t11, the microcomputer 5 can estimate the valve opening operation of the injection valve 2a as accurately as possible.

The boost controller 13 may stop the generation control of the boost voltage Vboost only when the current monitor 15 detects the electric current. Thereby, the accuracy of the current detected by the current monitor 15 can be improved, and a timing at which the boost control can be performed is appropriately set.

Seventh Embodiment

Figure 8:
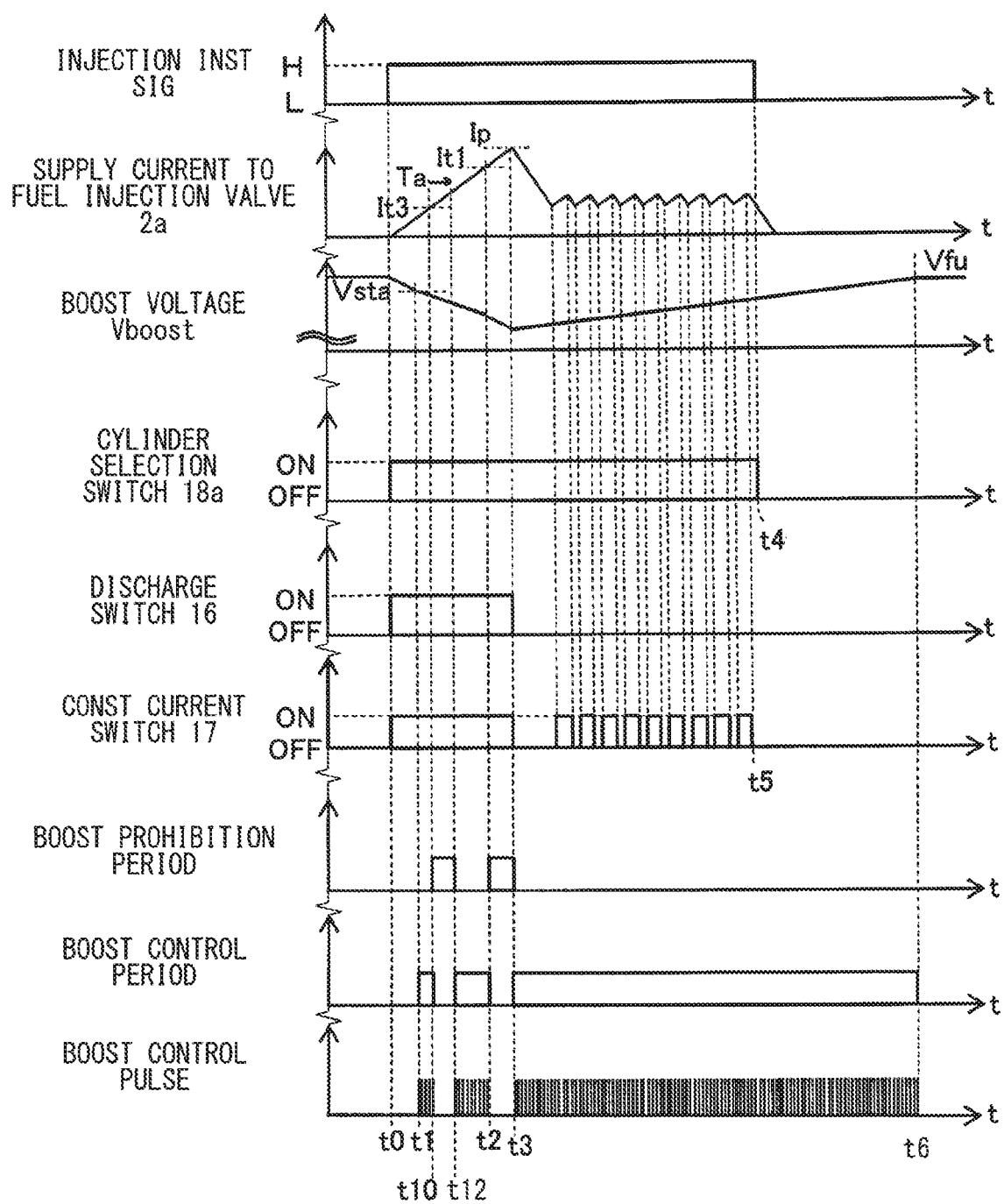
FIG. 8 is a timing chart schematically showing a signal change in a seventh embodiment of the present disclosure.

FIG. 8 shows an additional explanatory diagram of the seventh embodiment of the present disclosure. Also in the seventh embodiment, the boost prohibition period is changed. In particular, as shown in FIG. 8, in a period (i) from timing t2 when the supply current of the fuel injection valve 2a exceeds the first predetermined current It1 (ii) to timing t3 when the peak current threshold value Ip is reached (i.e., timing t2 to t3 in FIG. 8) and in a period (iii) from timing t10 when the supply current to the fuel injection valve 2a exceeds the third predetermined current It3 after the start of supplying the supply current and before reaching the first predetermined current It1 (iv) to timing t12 when a third predetermined time Ta has lapsed from timing t10, the boost controller 13 stops the generation control of the boost voltage Vboost (i.e., timing t10 to t12 in FIG. 8). In such case, since the boost controller 13 stops the generation control of the boost voltage Vboost from timing t10 to t12 during which the supply current rises toward the peak current threshold value Ip, the supply current of the fuel injection valve 2a can be accurately detected during the current rise period from timing t10 to t12. When the supply current of the fuel injection valve 2a can be accurately detected in the period from timing t10 to t12, the microcomputer 5 can estimate the valve opening operation of the fuel injection valve 2a as accurately as possible.

The boost controller 13 may stop the generation control of the boost voltage Vboost only when the current monitor 15 detects the electric current. Thereby, the accuracy of the current detected by the current monitor 15 can be improved, and a timing at which the boost control can be performed is appropriately set.

The present disclosure should not be limited to the embodiments described above, and various modifications may further be implemented without departing from the gist of the present disclosure. For example, the following modifications or extensions are possible. Two or more embodiments described above may be combined to implement the control of the present disclosure as required.

In the above embodiment, the control method for one of the fuel injection valves 2a has been described as an example. However, the present disclosure is not limited thereto and can be applied to the control method for the other fuel injection valve 2b. In such a case, for the current supply of any of the fuel injection valves 2a, 2b, the boost controller 13 may stop the boost control during the period including the peak current threshold value Ip.

In the above embodiments, for the brevity of the description, the fuel injection valves 2a, 2b in two cylinders are described. However, the same control is implementable for the valves in four cylinders, six cylinders and the like. In recent years, multi-stage injection to quickly inject fuel at multiple times into many cylinders in one cycle of the engine is required. That is, in other words, for the multi-stage injection, boosting the voltage of the boost capacitor 12 in the booster circuit 4 needs to be more quickly performed. In such a case, if the generation control of the boost voltage Vboost is stopped during the entire application period of the boost voltage to the fuel injection valve the boost process may be performable only for a short time, i.e., may only be insufficiently performable for obtaining the boost voltage Vboost.

As described in each of the above embodiments, the boost controller 13 may temporarily stop the generation control of the boost voltage Vboost during the series of injection processes, thereby eliminating the unnecessary stopping of the boost control and speeding the boost process of the boost capacitor 12 of the circuit 4. Further, the configuration of the drive circuit 7 is not limited to the configuration described in the above embodiments, i.e., may be changed as appropriate. In the sixth and seventh embodiments, the boost control is stopped twice before the supply current of the fuel injection valve 2a reaches the peak current, but the boost control may be stopped three or more times.

In the above embodiments, the configuration in which the diodes 21a and 21b regenerate the stored energy of the fuel injection valves 2a and 2b to the boost capacitor 12 having the boost voltage Vboost is described. However, the present disclosure is not limited to such configuration. That is, when a capacitor (not illustrated) is provided as an output node of the power supply voltage VB, the circuit may be configured to return the regenerative current to such a capacitor.

The microcomputer 5 and the control IC 6 may be integrated in one body or may be separately provided, and various other control devices may be used in place of the microcomputer 5 and the control IC 6. Methods and/or functions provided by the controllers may be realized by a software stored in the substantive storage medium and a computer executing such software, by software only, by hardware only, or by a combination thereof. For example, if the controller is provided by an electronic circuit, i.e., as hardware, the controller may be made up from a digital circuit or an analog circuit including one or more logic circuits. Further, for example, when the controller implements various controls by using software, a program is stored in the storage unit, and a method corresponding to the program is performed by the control subject (i.e., by a device) that executes such program.

In the above-described embodiments, the discharge switch 16, the constant current switch 17, and the cylinder selection switches 8a, 8b are described as the MOS transistors. However, other types of transistors such as bipolar transistors and/or various types of switches may also be usable.

The embodiments described above may be combined to implement the control of the present disclosure and the technical scope of the present disclosure is not necessarily limited thereto. In addition, various modifications from the present disclosure in the claims are considered also as an embodiment thereof as identified by the claim language.

Although the present disclosure is described based on the above embodiments, the present disclosure is not limited to the disclosure of the embodiment and the structure. The present disclosure is intended to cover various modification examples and equivalents thereof. In addition, various modes/combinations, one or more elements added/subtracted thereto/therefrom, may also be considered as the present disclosure and understood as the technical thought thereof.

What is claimed is:

1. An injection control device comprising:
   a current supply controller controlling a supply of an electric current for opening and closing a fuel injection valve by supplying a power supply voltage to the fuel injection valve;
   a current monitor monitoring the supply of the electric current to the fuel injection valve;
   a booster circuit including an inductor, a booster circuit switching element, a booster diode and a boost capacitor; and
   a boost controller performing a boost voltage generation control that generates a boost voltage from the power supply voltage by a turning ON/OFF control of the booster circuit switching element,
   wherein the boost controller prohibits boosting during a peak boost prohibition period, wherein the peak boost prohibition period satisfies at least one of the following conditions: (i) includes a peak timing corresponding to reaching a peak current threshold, wherein the peak boost prohibition period including the peak timing begins before the peak timing and ends after the peak timing, and (ii) ends at the peak timing,
   wherein the boost voltage is greater than the power supply voltage, and
   wherein a boost control period:
      (i) pauses the boosting when the peak boost prohibition period begins, and
      (ii) resumes the boosting until the peak boost prohibition period of a subsequent supply of the electric current to the fuel injection valve.

2. The injection control device of claim 1, wherein the peak boost prohibition period is (i) from a timing when the supply current of the fuel injection valve exceeds a first predetermined current that is set to be lower than the peak current threshold (ii) to a timing when the supply current reaches the peak current threshold.

3. The injection control device of claim 1, wherein
the peak boost prohibition period is (i) from a timing when the supply current of the fuel injection valve exceeds a first predetermined current that is set to be lower than the peak current threshold (ii) to a timing after lapse of a first predetermined time therefrom.

4. The injection control device of claim 1, wherein
the peak boost prohibition period is (i) from a timing when the supply current of the fuel injection valve reaches the peak current threshold (ii) to a timing when the supply current falls below a subsequent predetermined current that is set to be lower than the peak current threshold.

5. The injection control device of claim 1, wherein
the peak boost prohibition period is (i) from a timing when the supply current of the fuel injection valve exceeds a first predetermined current that is set to be lower than a peak current threshold (ii) to a timing when the supply current reaches to a second predetermined current that is set to be lower than the first predetermined current.

6. The injection control device of claim 1, wherein
the peak boost prohibition period is (i) from a timing after lapse of a first predetermined time from a start of the current supply to the fuel injection valve (ii) to a timing after lapse of a second predetermined time from the start of the current supply to the fuel injection valve.

7. The injection control device of claim 2, wherein
a preliminary boost prohibition period is (i) from a timing when the supply current of the fuel injection valve exceeds a first preliminary predetermined current (ii) to a timing when the supply current reaches a second preliminary predetermined current, and wherein the preliminary boost prohibition period occurs before the peak boost prohibition period.

8. The injection control device of claim 2, wherein
a preliminary boost prohibition period is (i) from a timing when the supply current of the fuel injection valve exceeds first preliminary predetermined current (ii) to a timing after lapse of a preliminary predetermined time after the first preliminary predetermined current is exceeded, and wherein the preliminary boost prohibition period occurs before the peak boost prohibition period.

9. The injection control device of claim 1, wherein
the current monitor continuously detects the electric current flowing through the fuel injection valve,
the boost controller is further configured to,
  upon detecting that the electric current which is detected has reached a first predetermined current, prohibit boosting, wherein the first predetermined current is lower than the peak current threshold and is based on (i) a value of the electric current corresponding to the peak current threshold and (ii) the electric current being able to reach the peak current threshold after stopping generation of the boost voltage, and
  upon detecting that the electric current which is detected has reached the peak current threshold, restart the boost voltage.

10. The injection control device of claim 1, wherein the boosted voltage which is generated by the boost controller exceeds the power supply voltage.

11. An electronic control system comprising:
a booster circuit configured to generate a boost voltage when receiving a boost control pulse, wherein the boost voltage is higher than a power supply voltage to the booster circuit;
a control integrated circuit configured to transmit the boost control pulse under certain conditions, and configured to measure a current;
a drive circuit configured to receive the boost voltage; and
terminals connected to the drive circuit,
wherein the control integrated circuit is configured to determine a peak boost prohibition period based at least partly upon the current,
wherein the control integrated circuit is configured to prohibit the boost control pulse during the peak boost prohibition period,
wherein the peak boost prohibition period satisfies at least one of the following conditions: (i) includes a peak timing corresponding to reaching a peak current threshold, and (ii) ends at the peak timing, and
wherein a boost control period:
  (i) pauses the boosting when the peak boost prohibition period begins, and
  (ii) resumes the boosting until the peak boost prohibition period of a subsequent supply of the boost voltage.

12. The electronic control system of claim 11,
wherein the booster circuit includes a boost capacitor, and
wherein the peak boost prohibition period permits the boost capacitor to discharge through a discharge switch of the drive circuit.

13. The electronic control system of claim 11,
wherein the peak boost prohibition period begins when the current is approximately equal to a first predetermined current, and ends when the current is approximately equal to a peak current threshold value.

14. The electronic control system of claim 13,
wherein the boost control pulse stops when the peak boost prohibition begins, and resumes when the peak boost prohibition period ends.

15. The electronic control system of claim 11, wherein the boosted voltage which is generated by the booster circuit exceeds the power supply voltage.

* * * * *